(12) United States Patent
Matthew et al.

(10) Patent No.: US 10,489,146 B2
(45) Date of Patent: Nov. 26, 2019

(54) PRE-HEATED SOFTWARE INSTALLATION

(71) Applicant: Apple Inc., Cupertino, CA (US)

(72) Inventors: Jack R. Matthew, San Francisco, CA (US); Randy D. Saldinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/192,357

(22) Filed: Jun. 24, 2016

(65) Prior Publication Data

US 2016/0306621 A1    Oct. 20, 2016

Related U.S. Application Data

(63) Continuation of application No. 12/958,236, filed on Dec. 1, 2010, now Pat. No. 9,378,007.

(51) Int. Cl.
| | |
|---|---|
| *G06F 8/656* | (2018.01) |
| *G06F 8/60* | (2018.01) |
| *G06F 8/61* | (2018.01) |
| *G06F 8/65* | (2018.01) |

(52) U.S. Cl.
CPC .............. *G06F 8/656* (2018.02); *G06F 8/60* (2013.01); *G06F 8/61* (2013.01); *G06F 8/65* (2013.01)

(58) Field of Classification Search
CPC ..... G06F 8/65; G06F 8/60; G06F 8/61; G06F 8/67
See application file for complete search history.

(56) References Cited

U.S. PATENT DOCUMENTS

| | | |
|---|---|---|
| 5,577,244 A | 11/1996 | Killebrew et al. |
| 6,167,567 A | 12/2000 | Chiles et al. |
| 6,282,709 B1 | 8/2001 | Reha et al. |
| 6,353,926 B1 | 3/2002 | Parthesarathy et al. |
| 7,574,706 B2 | 8/2009 | Meulemans et al. |
| 8,578,332 B2 | 11/2013 | Murray |
| 2002/0078142 A1 | 6/2002 | Moore et al. |
| 2003/0130985 A1 | 7/2003 | Driesen |
| 2004/0088694 A1 | 5/2004 | Ho |

(Continued)

FOREIGN PATENT DOCUMENTS

| | | |
|---|---|---|
| CN | 101895873 A | 11/2010 |
| EP | 1096445 A2 | 5/2001 |

(Continued)

OTHER PUBLICATIONS

PCT Search Report and Written Opinion of the International Searching Authority, or the Declaration, for PCT/US2011/016908, dated Apr. 27, 2012.

(Continued)

*Primary Examiner* — Jacob D Dascomb

(74) *Attorney, Agent, or Firm* — Womble Bond Dickinson (US) LLP

(57) ABSTRACT

Some embodiments of a method and an apparatus for pre-heated software installation have been presented. In one embodiment, packages of updates to software are downloaded from a remote source to a computing system in a background operation of a computing environment in the computing system. Then installation of the packages of the updates is initiated automatically in the background operation in an isolated manner without committing to the software updates.

29 Claims, 8 Drawing Sheets

(56) References Cited

U.S. PATENT DOCUMENTS

| | | |
|---|---|---|
| 2006/0075001 A1 | 4/2006 | Canning et al. |
| 2006/0184926 A1 | 8/2006 | Or et al. |
| 2006/0282834 A1 | 12/2006 | Cheng et al. |
| 2007/0006214 A1* | 1/2007 | Dubal .................. G06F 8/65 717/171 |
| 2007/0014314 A1 | 1/2007 | O'Neil |
| 2007/0150886 A1 | 6/2007 | Shapiro |
| 2008/0301667 A1 | 12/2008 | Rao et al. |
| 2009/0193409 A1 | 7/2009 | Dave et al. |
| 2009/0235244 A1 | 9/2009 | Enomori et al. |
| 2009/0307282 A1 | 12/2009 | Chang |
| 2009/0307477 A1 | 12/2009 | Matthew et al. |
| 2010/0088281 A1* | 4/2010 | Driesen .................. G06F 8/65 707/641 |
| 2010/0313196 A1 | 12/2010 | De Atley |
| 2011/0099516 A1* | 4/2011 | Hughes .................. G06F 8/61 715/810 |
| 2011/0265072 A1 | 10/2011 | Matthew |
| 2011/0289499 A1* | 11/2011 | Haubold .................. G06F 8/65 717/173 |

FOREIGN PATENT DOCUMENTS

| | | |
|---|---|---|
| EP | 1160666 A2 | 12/2001 |
| JP | 2007-148656 | 6/2007 |
| JP | 2009217656 | 9/2009 |
| KR | 10-2006-0092277 | 8/2006 |
| WO | WO 01/06798 A1 | 1/2001 |

OTHER PUBLICATIONS

PCT International Preliminary Report on Patentability for PCT/US2011/061908 dated Jun. 13, 2013.

Invitation to Pay Additional Fees and, Where Applicable, Protest Fee mailed Feb. 21, 2012 for PCT Application No. PCT/US2011/081908 filed Nov. 22, 2011.

* cited by examiner

PRE-HEATED SOFTWARE INSTALLATION

This application is a continuation of co-pending U.S. application Ser. No. 12/958236 filed on Dec. 1, 2010,

FIELD

Embodiments of the invention relate to installing software onto a computer, and more particularly to updating a computing system with a new version of software.

BACKGROUND

Updates to computing systems and various software applications are a practical necessity in today's computing world. Developers are continually working to improve the quality, efficiency and functionality of the computer systems and applications we use. Traditionally, installation of updates to computing systems takes a long time. Further, during installation of updates, other applications or processes running on the computing system may be disrupted or interfered. Thus, users of computing systems frequently put off installation of updates when prompted to avoid a long disruption of their work.

SUMMARY OF THE DESCRIPTION

Some embodiments of the present disclosure include automatically downloading available updates to software and initiating installation of the updates downloaded. In one embodiment, packages of updates to software are downloaded from a remote source to a computing system in a background operation of a computing environment in the computing system. Then installation of the packages of the updates is initiated automatically in the background in an isolated manner without committing the computing system to the software updates. A background operation can be an operation that is performed while a user is allowed to interact with other processes that control front most user interface elements (e.g., front window) and that have the input focus (e.g., keyboard and mouse or touch inputs are directed to the front most process that the user is interacting with currently). In other words, a foreground process or operation can receive user inputs (e.g., keyboard, mouse, touch input, etc.) while a background operation does not although a background operation can be visible to a user.

Some embodiments of the present disclosure include a method for pre-installing software updates. In one embodiment, only a portion of installation of a set of updates to software on a computing system is performed without interfering with processes currently running on the computing system. Then a user of the computing system is notified of the set of updates, whereas completion of the installation of the entire set of updates is held off until the user affirmatively allows or approves the entire set of updates.

Some embodiments of the present disclosure include an apparatus for pre-installing software updates. In one embodiment, the apparatus includes a computer-readable storage device to store instructions and data of software, a network interface to communicably couple to a computing machine via a network to download updates to the software, and a processing device. The processing device is operable to pre-install the updates in a reserved area on the computer-readable storage device without over-writing the existing instructions and data of the software.

Some embodiments of the present disclosure include a method for pre-installing software updates. In one embodiment, updates to software are partially installed on a computing system via a process running in a background operation of the computing system. Then a user of the computing system is notified of the updates. In an alternative embodiment, the computing system can notify the user of the background operation, either before or during the background operation. In response to the user approving the updates, installation of the updates is completed on the computing system. In some embodiments, the user may approve part of the updates. In response, the work performed so far to pre-install the updates may be undone, and then only the approved updates are installed.

Various devices which perform one or more of the foregoing methods and machine-readable media which, when executed by a processing system, cause the processing system to perform these methods, are also described.

Other methods, devices and computer-readable storage media are also described.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in some embodiments" or "in an alternate embodiment" appearing herein describe various embodiments and implementations of the invention, and do not necessarily all refer to the same embodiment. However, they are also not necessarily mutually exclusive.

DETAILED DESCRIPTION

Embodiments described herein facilitate installation of new software and/or updates of software to a computing system. In order to keep the description dear and concise, embodiments discussed herein will frequently refer to the installation of updates to software (e.g., operating system, user applications, etc.). However, embodiments are not limited to installation of updates. Methods, techniques, systems, components, etc. described herein can be used for new applications as well.

In some embodiments, an installation process of updates to software on a computing system is initiated and carried out as much as possible without interfering with a current version of the software on the computing system before informing or notifying a user of the computing system of the updates. Thus, the above portion of the installation process carried out may also be referred to as pre-installation of the updates, or pre-heating of the installation of the updates. After pre-heating the installation of the updates, the user is notified of the updates and asked if the user approves the updates. If the user approves the updates, then the installation process is completed to commit the updates to the computing system. Otherwise, if the user rejects the updates, then the work performed during the pre-heating may be undone.

In some embodiments, if the user approves some of the updates, but rejects the remaining updates, then the work performed during the pre-heating may be undone and the installation process may be restarted to install only the updates approved. In an alternate embodiment, the pre-heating may include pre-installation of a number of predetermined combinations of updates. If the combination of updates approved by the user is one of these predetermined combinations, then the installation of this combination of updates can be completed upon user approval. Otherwise, the work performed during the pre-installation of the predetermined combinations of updates may be undone and the installation process may be restarted to install only the updates approved.

By carrying out at least a portion of the installation of updates prior to notifying the user of the updates, the work for installation of the updates remains to be done upon user approval of the updates is significantly reduced. As a result, the time spent to install the updates as perceived by the user becomes significantly shorter, thus, improving user experience with update installation. Moreover, the interruption to the user caused by the installation of updates is reduced because part of or almost all of the installation process has been carried out in the background without interfering with the user or other processes running on the computing system. With shortened user-perceived installation time and reduced user interruption, users are more likely to approve updates to software on the computing system.

Figure 1A:
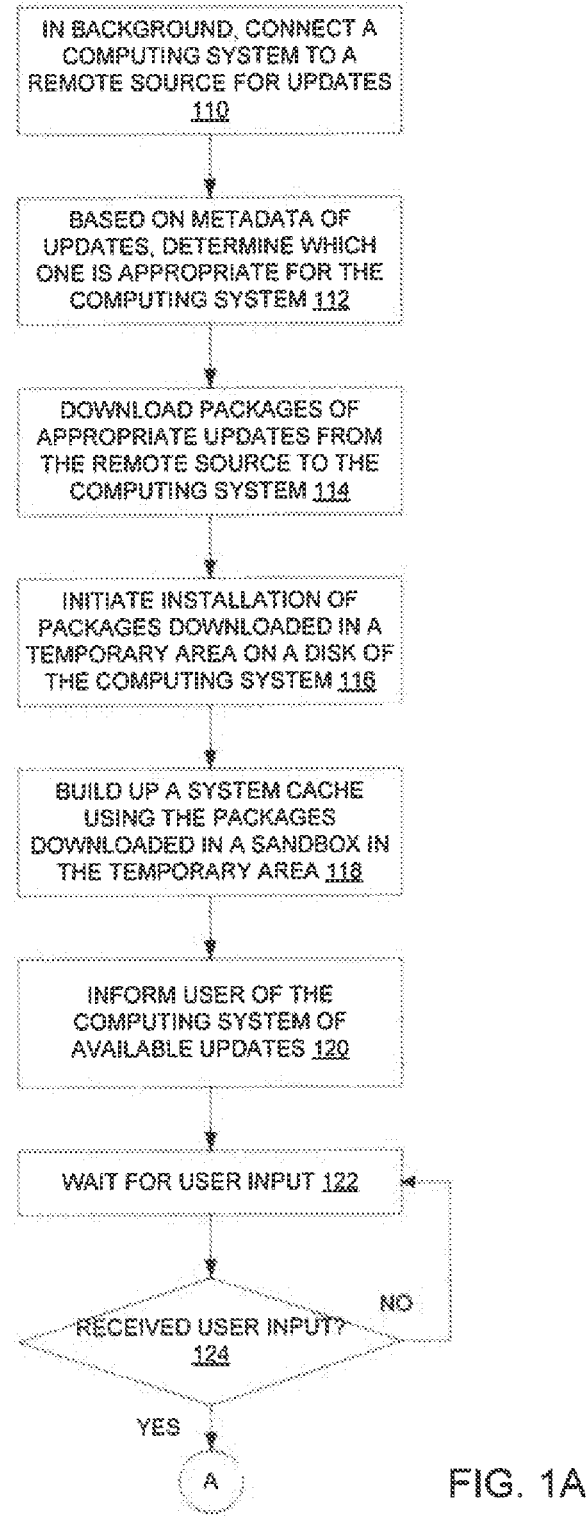
FIGS. 1A-1B illustrate a flow diagram of a process for pre-heated installation of software updates on a computing system according to various embodiments.
Figure 1B:
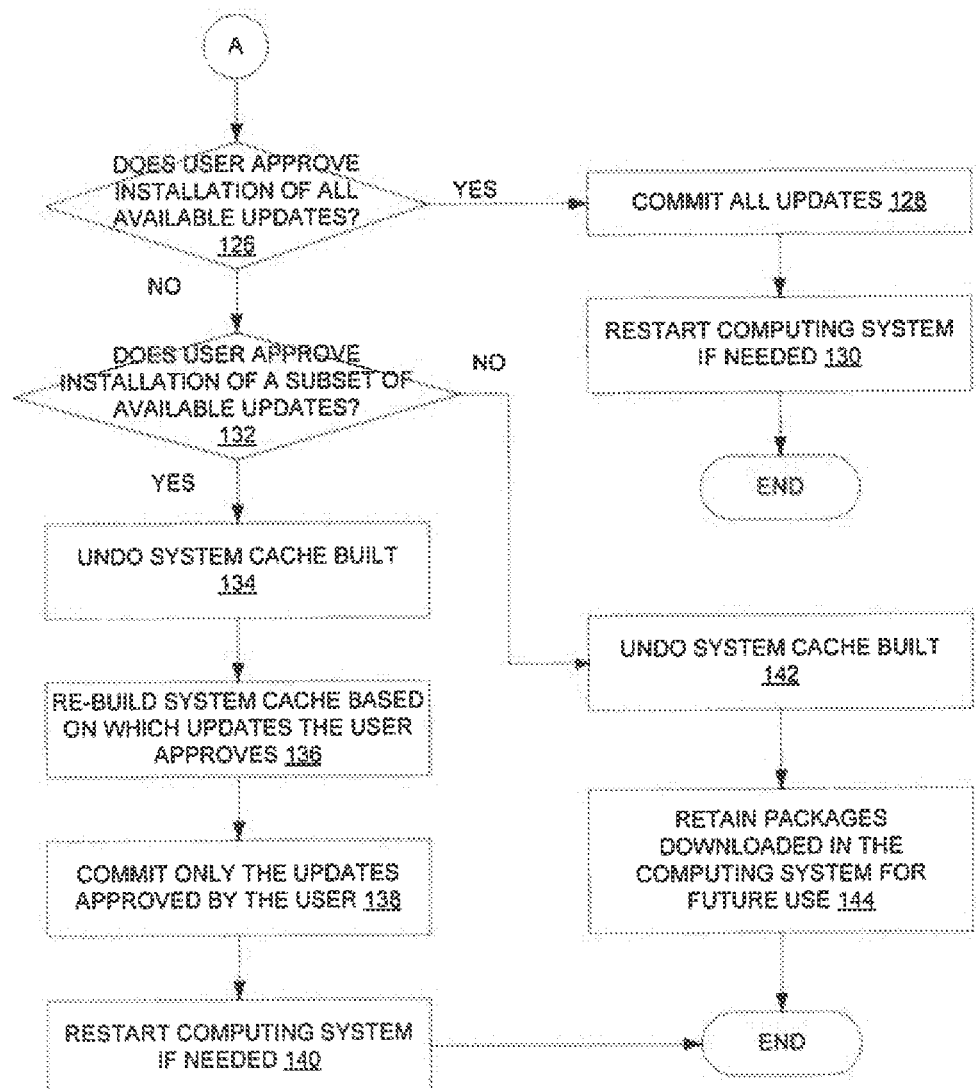

FIGS. 1A-1B illustrate a flow diagram of a process for pre-heated installation of software updates on a computing system according to various embodiments. The process may be performed by processing logic including software, hardware, firmware, or a combination of any of the above. For example, the process may be performed by processing logic implemented with the computing device illustrated in FIG. 5 as discussed below.

Referring to FIG. 1A, processing logic connects a computing system to a remote source for updates to software in a background of the computing system (processing block 110). The remote source may be another computing device, such as a server, a personal computer, etc., connected, via wireless networks and/or wired networks, to the computing system. The networks may include a local area network (LAN), wide area network (WAN), Ethernet, etc. The updates to software may include upgrades to software, new versions of software, security patches of software, etc. Note that processing logic connects the computing system to the remote source in the background of the computing system, and thus, without interfering with current processes running in the computing system. Therefore, a user of the computing system may not be aware of what processing logic is doing. In some embodiments, processing logic may periodically query the remote source to detect available updates.

Based on metadata of updates available at the remote source, processing logic determines which update(s) are appropriate for the computing system (processing block 112). Some examples of the metadata may include version numbers, licensing or entitlement information, system requirements, etc. Then processing logic downloads packages of the appropriate updates from the remote source to the computing system (processing block 114).

In some embodiments, processing logic initiates installation of packages downloaded in a temporary area on a computer-readable storage device (e.g., a disk) of the computing system (processing block 116). Processing logic may have reserved this temporary area on the disk for installation of updates. Further, this temporary area on the disk may be isolated from the rest of the disk such that the updates partially installed in this temporary area would not overwrite or interfere with a current version of the software in the computing system before the updates are committed. As such, this temporary area may be referred to as a sandbox, and the partially installed updates may also be referred to as being sandboxed. The installation can include downloading compressed files that will be decompressed as part of the installation process; moreover, the installation process can include the arrangement of files, including executable software, in a storage device, such as a magnetic hard drive or a non-volatile semiconductor memory. The installation can also include the creation or modification of folders or directories, registry entries (e.g., in Microsoft Windows), configuration file entries, and links or shortcuts, and a subset of these items. The processing logic can build up a system cache using the packages downloaded in the temporary area (processing block 118). In some embodiments, a chunk of memory in the computer-readable storage device that composes the pre-initialized state is saved off, and then read back in, and can be used without further ado. This chunk of memory, which may be serialized to disk, is the cache. For example, processing logic may extract files of the updates from the packages (which may have been compressed and/or encrypted), decompress and/or decrypt these files, if needed, and then arrange these files in a predetermined hierarchy in the temporary area, mirroring a hierarchy of similar files in a system cache currently in use in the computing system.

In some embodiments, there are two different caches that need updating, namely, the kernel/text cache and the dyld shared cache. The kernel/text cache is related to driver code (which may be provided by a vendor of the operating system of the computing system and/or third parties) that needs to run in kernel space. The dyld shared cache is related to the shared code libraries used by applications in user space of the computing system. Both caches prevent the system from running through the conventional, more time consuming initialization process during subsequent boot or application launch cycles. Further details in connection with caches may be found in U.S. Pat. No. 7,607,000, entitled "Method for Booting an Operating System," by inventors Michael Smith and Joseph Sokol, Jr., which is hereby incorporated by reference in its entirety.

Next, processing logic informs the user of the computing system of the updates available (processing block 120). The above process can be referred to as pre-installation of the updates or pre-heating of the installation of the updates. In some embodiments, processing logic may generate a user interface (e.g., a graphical user interface) to display a message to notify the user of the available updates. The user interface may further allow the user to indicate whether the user approves or rejects the available updates. In some embodiments, the user interface may include user interface control (e.g., buttons, checkboxes, drop-down menus, etc.) to allow the user to select a subset of the available updates for approval or rejection. In other words, instead of approving or rejecting all of the available updates, the user can customize the process by choosing only certain updates to install.

After pre-installing the updates and informing the user of the updates available, processing logic waits for user input regarding the updates (processing block 122). At block 124, processing logic determines if any user input is received. If none, then processing logic returns to block 122 to continue waiting for user input. Otherwise, processing logic transitions to block 126 in FIG. 1B.

Referring to FIG. 1B, processing logic checks if the user approves installation of all available updates (processing block 126). If so, then processing logic commits all updates (processing block 128). For example, processing logic may finish or complete the installation of the updates by swapping the system cache built in the temporary area into the file system to replace the current system cache. In some embodiments, processing logic can change the pointer pointing to the current system cache to point to the newly built system cache in the temporary area, and delete the current system cache. In some embodiments, processing logic may perform a single atomic operation (e.g., a shove operation) to delete the current system cache and to move the newly built system cache into a location of the current system cache to replace the current system cache. Further details in connection with completing software installation may be found in U.S. patent application Ser. No. 12/242,348, entitled "Installation of Software onto a Computer," filed Sep. 30, 2008, by inventors Jack R. Matthew and John R. Chang, which is hereby incorporated by reference in its entirety. Optionally, processing logic may restart the computing system if needed to make the updates effective (processing block 130).

In some embodiments, if the user does not approve installation of all of the updates available at block 126, then processing logic may further check if the user approves installation of a subset of the available updates (processing block 132). If the user approves installation of a subset of the available updates, then processing logic may undo the system cache built (processing block 134). For instance, processing logic may simply delete the system cache built in the temporary area of the disk. Then processing logic may re-build a system cache based on which updates the user approves (processing block 136). Processing logic then commits only the updates approved by the user (processing block 138). In some embodiments, processing logic can change the pointer pointing to the current system cache to point to the newly built system cache in the temporary area, and delete the current system cache. In some embodiments, processing logic may perform a single atomic operation (e,g., a shove operation) to delete the current system cache and to move the newly built system cache into a location of the current system cache to replace the current system cache. Optionally, processing logic may restart the computing system if needed to make the updates effective (processing block 140).

If, at block 132, processing logic determines that the user does not even approve a subset of the available updates, i.e., the user rejects all of the available updates, then processing logic may undo the system cache but (processing block 142), in some embodiments, processing logic retains the packages downloaded in the computing system for future use (processing block 144). For example, processing logic may check for updates again later, and find a second set of updates. Further, processing logic may determine that some of the packages previously downloaded are still needed to install the second set of updates, and thus, these previously downloaded packages may be used then.

Figure 2A:
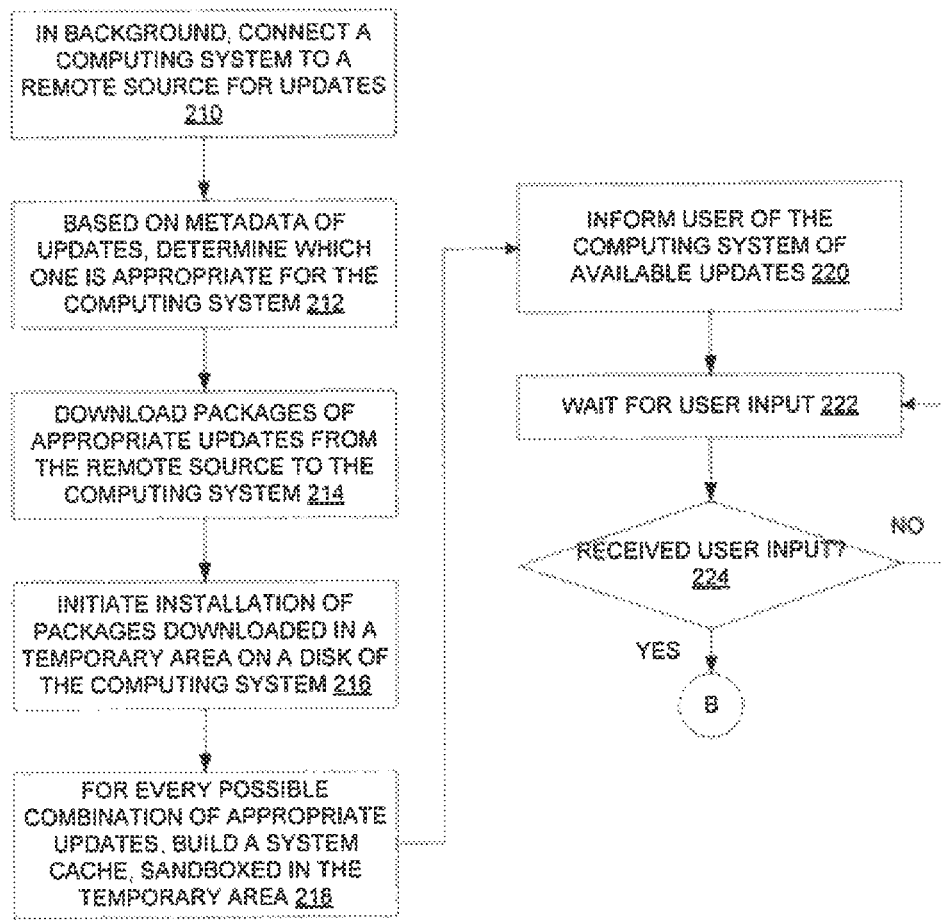
FIGS. 2A-2B illustrate a flow diagram of a process for pre-heated installation of software updates on a computing system according to various embodiments.
Figure 2B:
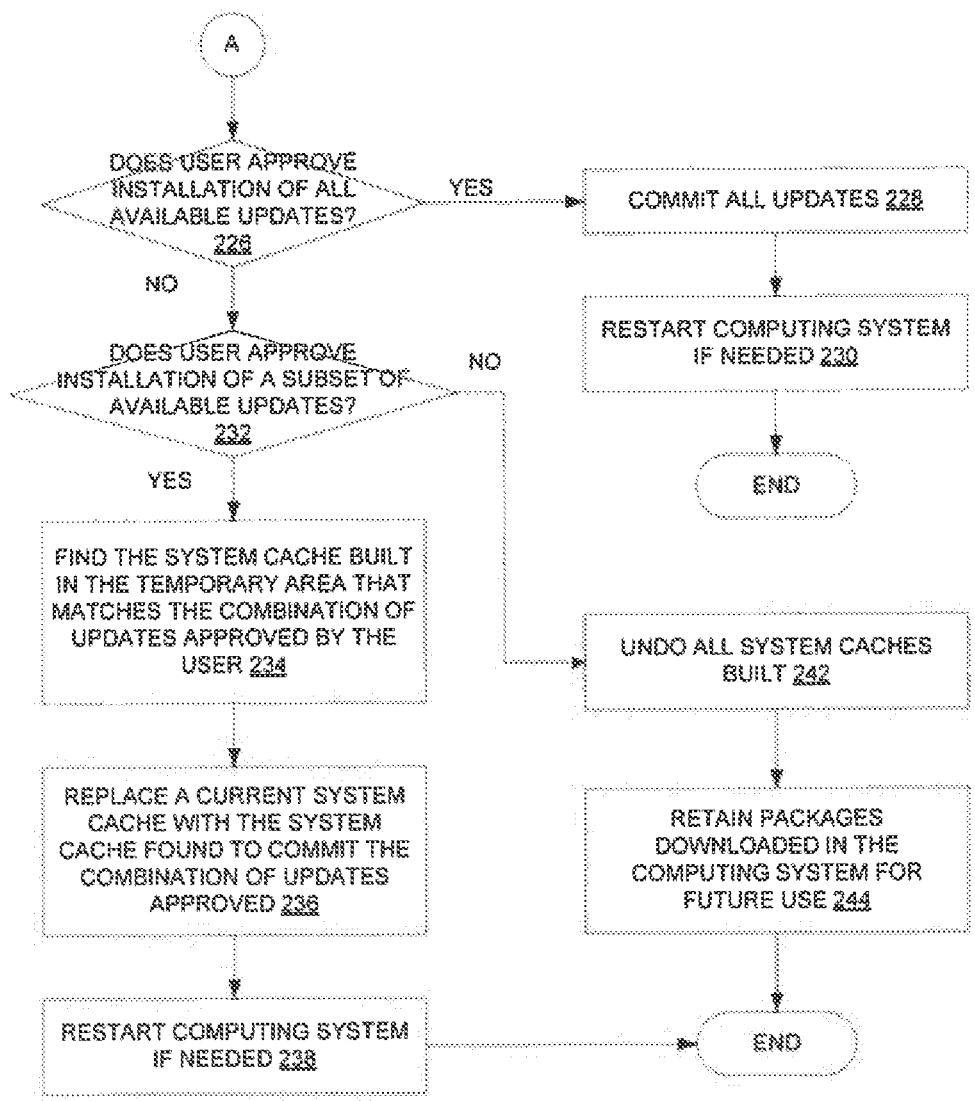

FIGS. 2A-2B illustrate a flow diagram of a process for pre-heated installation of software updates on a computing system according to various embodiments. Like the above process, this process may be performed by processing logic including software, hardware, firmware, or a combination of any of the above. For example, the process may be performed by processing logic implemented with the computing device illustrated in FIG. 5 as discussed below.

Referring to FIG. 2A, processing logic connects a computing system to a remote source for updates to software in a background of the computing system (processing block 210). The remote source may be another computing device, such as a server, a personal computer, etc., connected, via wireless networks and/or wired networks, to the computing system. The networks may include a local area network (LAN), wide area network (WAN), Ethernet, etc. The updates to software may include upgrades to software, new versions of software, security patches of software, etc. Note that processing logic connects the computing system to the remote source in the background of the computing system, and thus, without interfering with current processes running in the computing system. Therefore, a user of the computing system may not be aware of what processing logic is doing.

Based on metadata of updates available at the remote source, processing logic determines which update(s) are appropriate for the computing system (processing block 212). Some examples of metadata have been discussed above. Then processing logic downloads packages of the appropriate updates from the remote source to the computing system (processing block 214).

In some embodiments, processing logic initiates installation of packages downloaded in a temporary area on a computer-readable storage device of the computing system (processing block 216). For every possible combination of the updates, processing logic builds up a system cache using the packages downloaded, sandboxed in the temporary area (processing block 218). Details of some embodiments of system cache have been discussed above. The system cache built for each combination of updates is also sandboxed, that is, the system cache is isolated from other system caches built in the temporary area. Note that as these system caches are built at install time, the computing system can be made dynamic. In other words, different kernel extensions and libraries can exist across different deployments. For example, there can be two systems, each having a copy of the same operating system, but one copy may have a third party kernel extension to support a hardware product, while the other does not. In another example, there may be two computing systems both having a newer version of a system shared library that comes with one or more pre-selected user applications that may require a different dyld shared cache.

Subsequently, processing logic informs the user of the computing system of the updates available (processing block 220). The above process can be referred to as pre-installation of the updates or pre-heating of the installation of the updates. In some embodiments, processing logic may generate a user interface (e.g., a graphical user interface) to display a message to notify the user of the available updates. Details of some embodiments of user interface have been discussed above.

After pre-installing the updates and informing the user of the updates available, processing logic waits for user input regarding the updates (processing block 222). At block 224, processing logic determines if any user input is received. If none, then processing logic returns to block 222 to continue waiting for user input. Otherwise, processing logic transitions to block 226 in FIG. 2B.

Referring to FIG. 2B, processing logic checks if the user approves installation of all available updates (processing block 226). If so, then processing logic commits all updates (processing block 228). For example, processing logic may finish or complete the installation of the updates by swapping the system cache built in the temporary area into the file system to replace the current system cache. In some embodiments, processing logic can change the pointer pointing to the current system cache to point to the newly built system cache in the temporary area, and delete the current system cache. In some embodiments, processing logic may perform a single atomic operation (e.g., a shove operation) to delete the current system cache and to move the newly built system cache into a location of the current system cache to replace the current system cache. Optionally, processing logic may restart the computing system if needed to make the updates effective (processing block 230).

In some embodiments, if the user does not approve installation of all of the updates available at block 226, then processing logic may further check if the user approves installation of a subset of the available updates (processing block 232). If the user approves installation of a subset of the available updates, then processing logic finds the system cache built in the temporary area that matches the combination of updates approved by the user (processing block 234). Then processing logic may replace a current system cache with the system cache found to commit the combination of updates approved (processing block 236). In some embodiments, processing logic can change the pointer pointing to the current system cache to point to the system cache found in the temporary area, and delete the current system cache. In some embodiments, processing logic may perform a single atomic operation (e.g., a shove operation) to delete the current system cache and to move the system cache found into a location of the current system cache to replace the current system cache. Processing logic may further delete or remove the remaining system caches built in the temporary area for other combinations of updates. Finally, processing logic may restart the computing system if needed to make the updates effective (processing block 238). Because the system cache has been speculatively built prior to informing the user of the updates, the user-perceived update time (which may run from the user approving the selected updates to commitment of the selected updates) is shorter than conventional update installation time. Further, speculatively building system caches during pre-installation of updates also allow different kernel extensions and libraries to exist across different deployments, If, at block 232, processing logic determines that the user does not approve any one of the available updates, i.e., the user rejects ail of the available updates, then processing logic may undo the system caches built (processing block 242). In some embodiments, processing logic retains the packages downloaded in the computing system for future use (processing block 244). For example, processing logic may check for updates again later, and find a second set of updates. Further, processing logic may determine that some of the packages previously downloaded are still needed to install the second set of updates, and thus, these previously downloaded packages may be used then.

Figure 3A:
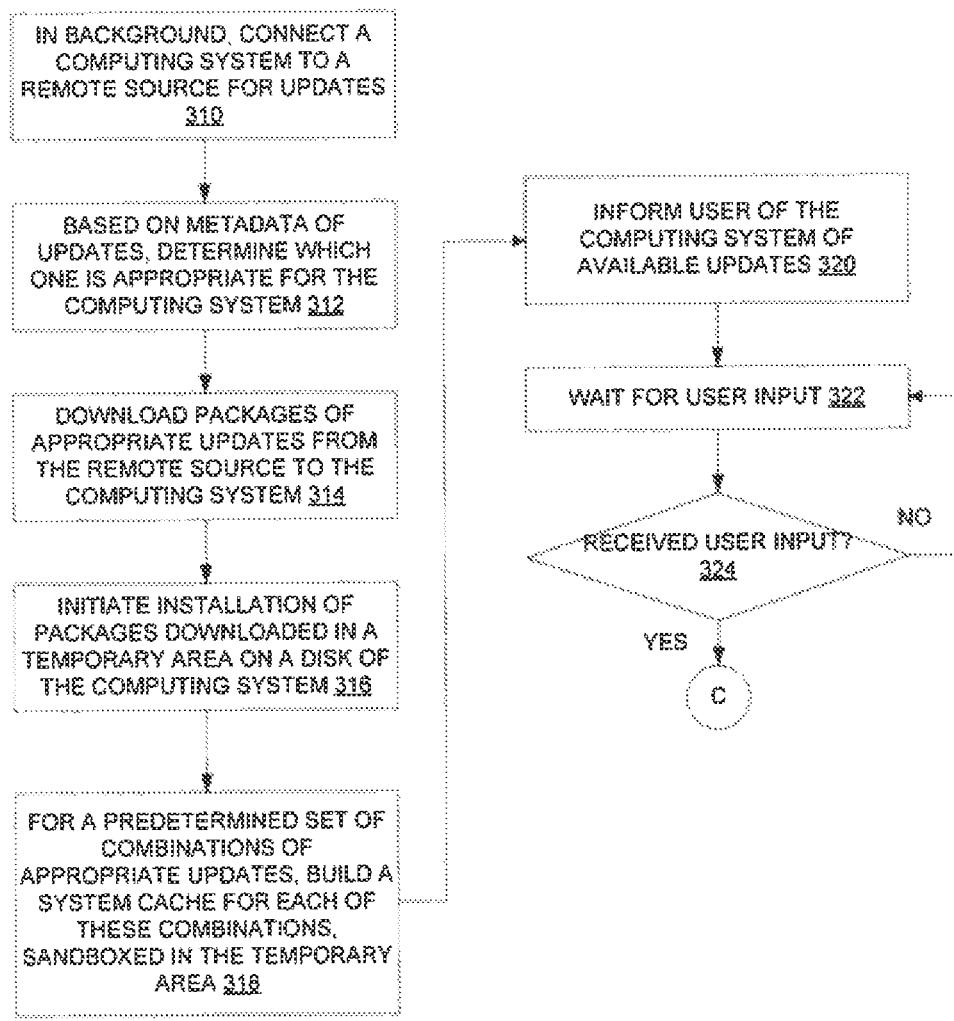
FIGS. 3A-3B illustrate a flow diagram of a process for pre-heated installation of software updates on a computing system according to various embodiments.
Figure 3B:
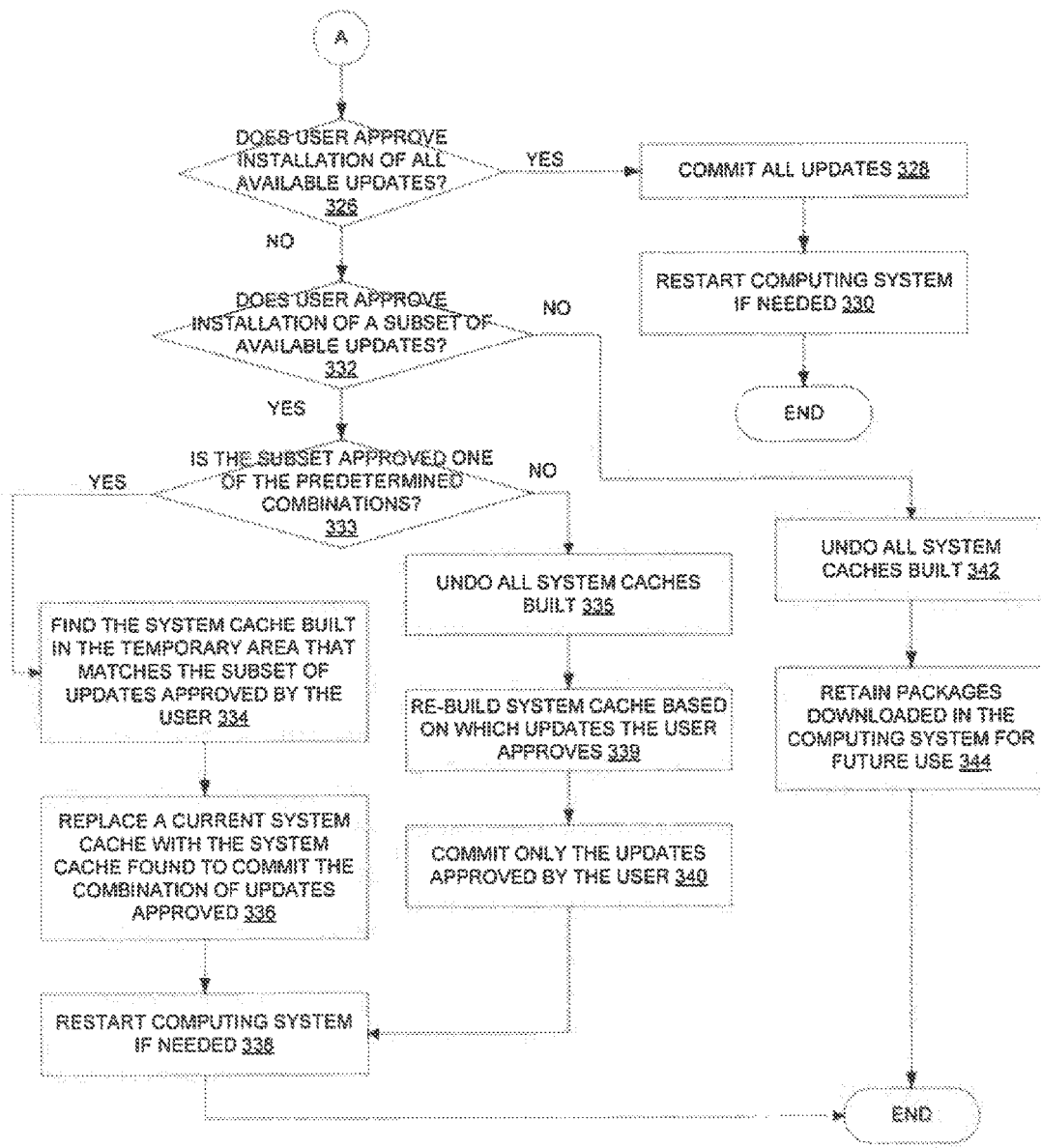

FIGS. 3A-3B illustrate a flow diagram of a process for pre-heated installation of software updates on a computing system according to various embodiments. Like the above process, this process may be performed by processing logic including software, hardware, firmware, or a combination of any of the above. For example, the process may be performed by processing logic implemented with the computing device illustrated in FIG. 5 as discussed below.

Referring to FIG. 3A, processing logic connects a computing system to a remote source for updates to software in a background of the computing system (processing block 310). The remote source may be another computing device, such as a server, a personal computer, etc., connected, via wireless networks and/or wired networks, to the computing system. The networks may include a local area network (LAN), wide area network (WAN), Ethernet, etc. The updates to software may include upgrades to software, new versions of software, security patches of software, etc. Note that processing logic connects the computing system to the remote source in the background of the computing system, and thus, without interfering with current processes running in the computing system. Therefore, a user of the computing system may not be aware of what processing logic is doing.

Based on metadata of updates available at the remote source, processing logic determines which update(s) are appropriate for the computing system (processing block 312). Some examples of metadata have been discussed above. Then processing logic downloads packages of the appropriate updates from the remote source to the computing system (processing block 314).

In some embodiments, processing logic initiates installation of packages downloaded in a temporary area on a computer-readable storage device of the computing system (processing block 316). For a predetermined set of possible combinations of the updates, processing logic builds up a system cache for each of these combinations using the packages downloaded, sandboxed in the temporary area (processing block 318). Details of some embodiments of system cache have been discussed above. Typically, the predetermined set of possible combinations includes the combination of all of the appropriate updates and one or more popular combinations of the appropriate updates. In other words, processing logic speculatively builds a number of system caches, and one of which may be chosen to commit the updates approved by the user later. The system cache built for each combination of updates is also sandboxed, that is, the system cache is isolated from other system caches built in the temporary area. Then processing logic informs the user of the computing system of the updates available (processing block 320). The above process can be referred to as pre-installation of the updates or pre-heating of the installation of the updates. In some embodiments, processing logic may generate a user interface (e.g., a graphical user interface) to display a message to notify the user of the available updates. Details of some embodiments of user interface have been discussed above.

After pre-installing the updates and informing the user of the updates available, processing logic waits for user input regarding the updates (processing block 322). At block 324, processing logic determines if any user input is received. If none, then processing logic returns to block 322 to continue waiting for user input. Otherwise, processing logic transitions to block 326 in FIG. 3B.

Referring to FIG. 3B, processing logic checks if the user approves installation of all available updates (processing block 326). If so, then processing logic commits all updates (processing block 328). For example, processing logic may finish or complete the installation of the updates by swapping the system cache built in the temporary area into the file system to replace the current system cache. In some embodiments, processing logic can change the pointer pointing to the current system cache to point to the newly built system cache in the temporary area, and delete the current system cache. In some embodiments, processing logic may perform a single atomic operation (e.g., a shove operation) to delete the current system cache and to move the newly built system cache into a location of the current system cache to replace the current system cache. Optionally, processing logic may restart the computing system if needed to make the updates effective (processing block 330).

In some embodiments, if the user does not approve installation of all of the updates available at block 326, then processing logic may further check if the user approves installation of a subset of the available updates (processing block 332). If the user approves installation of a subset of the available updates, then processing logic checks if the subset approved is one of the predetermined combinations (processing block 333). If so, then processing logic finds the system cache built in the temporary area that matches the combination of updates approved by the user (processing block 334). Then processing logic may replace a current system cache with the system cache found to commit the combination of updates approved (processing block 336). In some embodiments, processing logic can change the pointer pointing to the current system cache to point to the system cache found in the temporary area, and delete the current system cache. In some embodiments, processing logic may perform a single atomic operation (e.g., a shove operation) to delete the current system cache and to move the system cache found into a location of the current system cache to replace the current system cache. Processing logic may further delete or remove the remaining system caches built in the temporary area for other combinations of updates. Finally, processing logic may restart the computing system if needed to make the approved updates effective (processing block 338). Because the system cache has been speculatively built prior to informing the user of the updates, the user-perceived update time (which may run from the user approving the selected updates to commitment of the selected updates) is shorter than convention& update installation time. Further, speculatively building system caches during pre-installation of updates also allow different kernel extensions and libraries to exist across different deployments.

However, if processing logic determines that the subset approved is not one of the predetermined combinations at block 333, then processing logic may undo all system caches built (processing block 335), re-builds a system cache based on which updates the user approves (processing block 339), and commits only the updates approved by the user (processing block 340). Finally, processing logic may restart the computing system if needed to make the approved updates effective (processing block 338).

Figure 4:
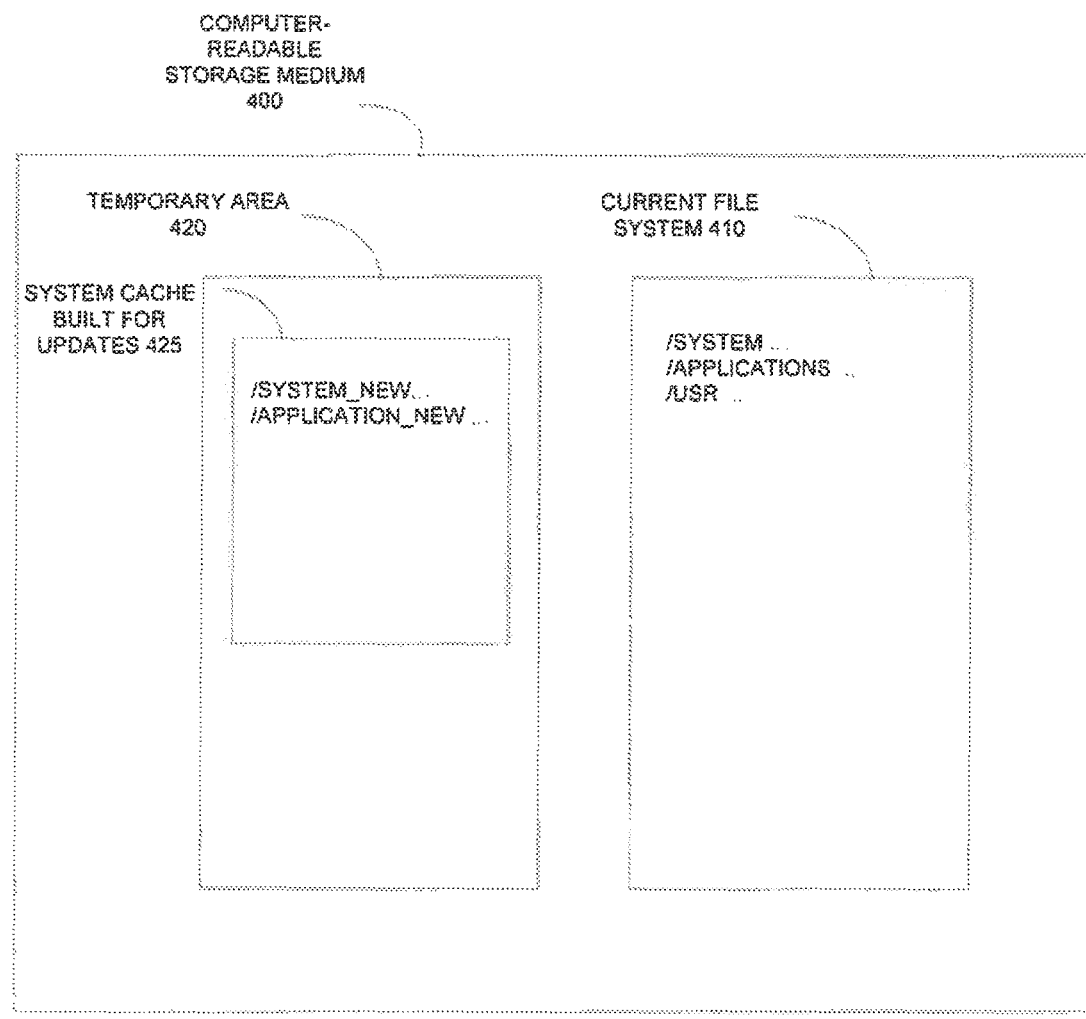
FIG. 4 is a block diagram illustrating one embodiment of a computer-readable storage device in a computing system usable in pre-heated software installation.

If, at block 332, processing logic determines that the user does not even approve any one of the updates, i.e., the user rejects all of the available updates, then processing logic may undo the system cache built (processing block 342). In some embodiments, processing logic retains the packages downloaded in the computing system for future use (processing block 344). For example, processing logic may check for updates again later, and find a second set of updates. Further, processing logic may determine that some of the packages previously downloaded are still needed to install the second set of updates, and thus, these previously downloaded packages may be used then, FIG. 4 is a block diagram illustrating one embodiment of a computer-readable storage device in a computing system usable in pre-heated software installation according to some embodiments of the invention. The computer-readable storage device 400 may include a hard disk in the computing system. The computer-readable storage device 400 stores a current file system 410 of the computing system. In addition, a temporary area 420 isolated from the current the system 410 is reserved for pre-installation of updates. During pre-installation of updates, a system cache 425 can be built in the temporary area 420 by organizing and storing files associated with the updates in a hierarchy of directories mirroring the hierarchy of the current file system 410. Additional system caches may be bunt in the temporary area 420 for different combinations of updates.

If a user approves ail updates, then the system cache 425 built in the temporary area 420 may be swapped into the current the system 410. If the user rejects all updates, then the system cache 425 built may be deleted. If the user approves only a subset of the updates, then the system cache 425 built may be deleted, and the approved subset of updates may be installed from scratch. In some embodiments, where multiple system caches corresponding to a predetermined combinations of updates have been bunt, one of the system caches built may be used to commit the approved subset of updates if the approved subset of updates happens to be one of the predetermined combinations of updates. Details of some embodiments of pre-installation of software updates have been discussed above.

Figure 5:
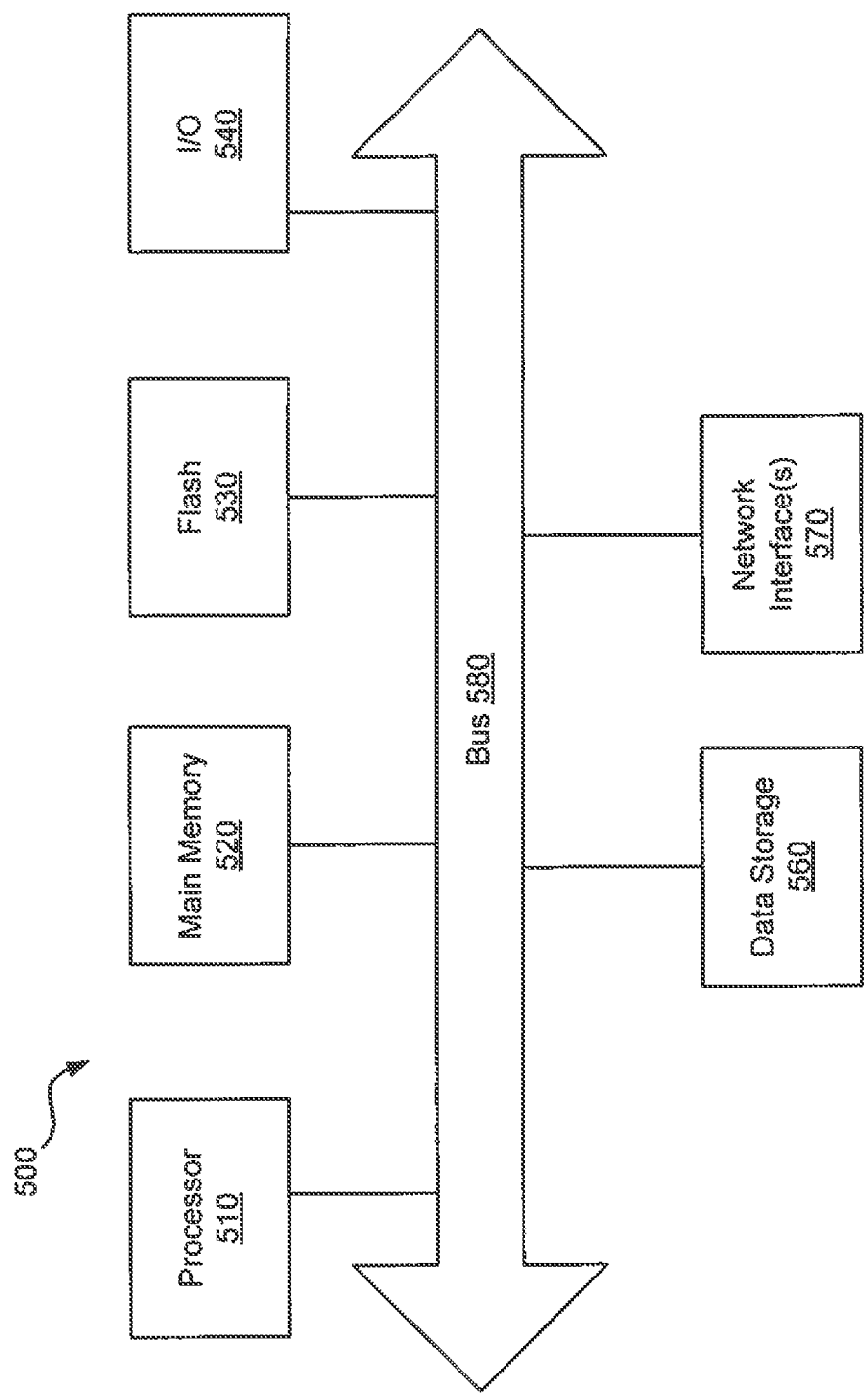
FIG. 5 is one embodiment of a computing device usable in some embodiments of the present disclosure.

FIG. 5 is a block diagram illustrating a suitable computing environment for practicing various embodiments described herein. Collectively, these components are intended to represent a broad category of hardware systems, including but not limited to general-purpose computer systems (e.g., servers, personal computers, laptop computers, etc) and specialized handheld computer devices (e.g., personal digital assistants (PDAs), smart phones, etc.).

Computing system 500 includes processor 510. I/O devices 540, main memory 520 and flash memory 530 coupled to each other via a bus 580. Main memory 520, which can include one or more of system memory (RAM), and non-volatile storage devices (e.g., magnetic or optical disks), stores instructions and data for use by processor 510. Additionally, network interfaces 570 and data storage 560 are coupled to each other via a bus 580. Data storage 560 stores the structured data (e.g., contact information, calendars, etc.) described herein, The various components of computing system 500 may be rearranged in various embodiments, and some embodiments may not require nor include all of the above components. Furthermore, additional components may be included in system 500, such as additional processors (e.g., a digital signal processor, a graphics processor, etc.), storage devices, memories, network/communication interfaces, etc.

In some embodiments, methods and apparatuses for pre-heated software installation or pre-installation of software updates according to the present invention as discussed above may be implemented as a series of software routines run by computing system 500 of FIG. 5. These software routines comprise a plurality or series of instructions to be executed by a processing system in a hardware system, such as processor 510. Initially, the series of instructions are stored on a data storage device 560, memory 520, and/or flash 530.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration, etc.) may be provided via an article of manufacture including a computer readable medium, which provides content that represents instructions that can be executed. The content may result in a computer performing various functions/operations described herein. A computer-readable (or machine readable or electronically accessible) medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer-readable medium may also include a storage or database from which content can be downloaded. A computer-readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method for reducing user-perceived time of installing a set of one or more updates to software on a computing system, the method comprising:
    performing a portion of an installation process of the set of one or more updates to software on the computing system automatically by a background operation of the computing system while the user is able to interact with foreground processes of the computing system, wherein performing the portion of the installation process of the set of updates includes downloading the one or more updates while the computing system is connected to a remote source for updates and decompressing and validating the set of updates during the background operation, prior to a user selecting which updates in the set of updates are approved for installation;
    building a system cache containing the decompressed set of updates in a sandboxed environment in an isolated area on a computer-readable storage device in the computing system, and arranging the decompressed set of updates in the system cache in a hierarchy mirroring the hierarchy of a system cache in use on the computing system;
    sending a notification of availability of the set of updates after performing the portion of the installation of the set of updates;
    receiving a user selection for approval of completing installation of selected updates in the set of updates;
    in response to the user selection for approval being fewer than all of the set of updates, re-building a system cache from the set of updates previously downloaded into the isolated area, based on the updates selected as approved for installation; and
    completing the installation process of updates selected from the set of updates in response to receiving approval to install the selected updates.

2. The method of claim 1, further comprising, in response to the user selection for approval being fewer than all of the set of updates:
    deleting the mirrored copy of the system cache.

3. The method of claim 2, wherein completing the installation of at least the portion of the set of updates includes:
    swapping in the system cache built to replace a current system cache in the computing system.

4. The method of claim 2, wherein completing the installation includes restarting the computing system.

5. The method of claim 4 wherein completing the installation includes swapping in the system cache built to replace a current system cache.

6. The method of claim 4 wherein the isolated area is reserved for performing the portion of installation of the set of one or more updates to software.

7. The method of claim 6, the method further comprising:
    downloading the set of updates in a background operation in the computing system.

8. The method of claim 7, the method further comprising:
    determining, based on metadata of updates available from a remote source, which updates are appropriate for the computing system.

9. The method of claim 8 wherein downloading the set of updates occurs after determining which updates are appropriate.

10. The method of claim 9 wherein performing the portion of installation does not over-write existing software instructions in use on the computing system.

11. A non-transitory computer-readable storage medium storing executable program instructions which when executed by a computing system cause the computing system to perform operations for reducing user-perceived time of installing a set of one or more updates to software on the computing device, the operations comprising:
    performing a portion of an installation process of the set of one or more updates to software on the computing system automatically by a background operation of the computing system while the user is able to interact with foreground processes of the computing system, wherein performing the portion of the installation process of the set of updates includes downloading the one or more updates while the computing system is connected to a remote source for updates and decompressing and validating the set of updates during the background operation, prior to a user selecting which updates in the set of updates are approved for installation;
    building a system cache for containing the decompressed set of updates in a sandboxed environment in an isolated area on a computer-readable storage device in the computing system, and arranging the decompressed set of updates in the system cache in a hierarchy mirroring the hierarchy of a system cache in use on the computing system;
    sending a notification of availability of the set of updates after performing the portion of the installation of the set of updates;
    receiving a user selection of updates in the set of updates for approval of completing installation;
    in response to the user selection for approval being fewer than all of the set of updates, re-building a system cache from the set updates previously downloaded into the isolated area, based on the updates selected as approved for installation; and
    completing the installation process of updates selected from the set of updates in response to receiving approval to install the selected updates.

12. The medium of claim 11, further comprising, in response to the user selection for approval being fewer than all of the set updates:
deleting the mirrored copy of the system cache.

13. The medium of claim 12, wherein completing the installation of at least the portion of the set of updates includes:
swapping in the system cache built to replace a current system cache in the computing system.

14. The medium of claim 12, wherein completing the installation includes restarting the computing system.

15. The medium of claim 14 wherein completing the installation includes swapping in the system cache built to replace a current system cache.

16. The medium of claim 14 wherein the isolated area is reserved for performing the portion of installation of the set of one or more updates to software.

17. The medium of claim 16, the method further comprising:
downloading the set of updates in a background operation in the computing system.

18. The medium of claim 17, the method further comprising:
determining, based on metadata of updates available from a remote source, which updates are appropriate for the computing system.

19. The medium of claim 18 wherein downloading the set of updates occurs after determining which updates are appropriate.

20. The medium of claim 19 wherein performing the portion of installation does not over-write existing software instructions in use on the computing system.

21. A computing system comprising:
a computer-readable storage device to store software instructions and data;
a network interface coupled to the computer-readable storage device to download a set of one or more updates to the software instructions;
one or more processing devices coupled to the network interface, the one or more processing devices to:
perform a portion of an installation process of the set of one or more updates to the software on the computing system automatically by a background operation of the computing system while the user is able to interact with foreground processes of the computing system, wherein to perform the portion of the installation process of the set of updates includes downloading the one or more updates while the computing system is connected to a remote source for updates and to decompress and validate the set of updates during the background operation, prior to a user selecting which updates in the set of updates are approved for installation, to build a system cache containing the decompressed set of updates in a sandboxed environment in an isolated area on the computer-readable storage device, and to arrange the decompressed set of updates in the system cache in a hierarchy mirroring the hierarchy of a system cache in use on the computing system;
send a notification of availability of the set of updates after the portion of the process of installation of the set of updates is performed;
receive a user selection of updates in the set of updates for approval of completing installation, in response to the user selection for approval being fewer than all of the updates in the set of updates, re-build a system cache from the set updates previously downloaded into the isolated area, based on the updates selected as approved for installation; and
complete the installation process of updates selected from the set of updates in response to receiving approval to install the selected updates.

22. The system of claim 21, wherein the one or more processing devices are further to complete installation by restarting the computing system.

23. A non-transitory computer-readable storage medium storing executable program instructions which when executed by a data processing system cause the data processing system to perform a method comprising:
performing only a partial installation of a set of one or more updates to software on a computing system automatically by a background operation of the computing system while the user is able to interact with foreground processes of the computing system, wherein performing only the partial installation of the set of updates includes downloading the one or more updates while the computing system is connected to a remote source for updates and decompressing and validating the set of updates during the background operation, prior to a user selecting which updates in the set of updates are approved for installation;
building a system cache for the set of updates in an isolated area on a computer-readable storage device in the computing system, decompressing the set of one or more updates prior to receiving a user selection of updates in the set of updates for installation, the system cache having a hierarchy based on the hierarchy of a system cache in use on the computing system;
sending a notification of availability of the set of updates after performing the partial installation of the set of updates;
receiving a user selection of updates in the set of updates for approval of completing the installation of the selected updates;
in response to the user selection for approval being fewer than all updates in the set of updates, re-building a system cache from the set updates previously downloaded into the isolated area, based on the updates selected as approved for installation; and
completing installation of the remaining portion of at least a subset of the set of updates after receiving approval of the set of updates.

24. The medium of claim 23, wherein performing the partial installation of the set of updates comprises:
building the system cache for the set of updates in an isolated area on the computer-readable storage device, the building including decompressing one or more files.

25. The medium of claim 24, wherein completing the installation of at least the subset of the set of updates includes:
swapping in the system cache built to replace a current system cache in the computing system.

26. The medium of claim 24, wherein completing the installation includes restarting the computing system.

27. The medium of claim 26 wherein completing the installation includes swapping in the system cache built to replace a current system cache.

28. The medium of claim 26 wherein the isolated area is reserved for performing the partial installation of the set of one or more updates to software.

29. The medium of claim 28, the method further comprising:
downloading the set of updates in a background operation in the computing system.

* * * * *